(12) United States Patent
Lavu et al.

(10) Patent No.: US 11,448,508 B2
(45) Date of Patent: Sep. 20, 2022

(54) SYSTEMS AND METHODS FOR AUTONOMOUS GENERATION OF MAPS

(71) Applicant: Kohl's, Inc., Menomonee Falls, WI (US)

(72) Inventors: Ratnakar Lavu, Menomonee Falls, WI (US); Klarissa Marenitch, Menomonee Falls, WI (US); Garima Agarwal, Menomonee Falls, WI (US); Supun Dewaraja, Menomonee Falls, WI (US)

(73) Assignee: Kohl's, Inc., Menomonee Falls, WI (US)

( * ) Notice: Subject to any disclaimer, the term of this patent is extended or adjusted under 35 U.S.C. 154(b) by 147 days.

(21) Appl. No.: 16/159,311

(22) Filed: Oct. 12, 2018

(65) Prior Publication Data

US 2019/0113349 A1 Apr. 18, 2019

Related U.S. Application Data (60) Provisional application No. 62/572,017, filed on Oct. 13, 2017.

(51) Int. Cl.
| | |
|---|---|
| *G01C 21/20* | (2006.01) |
| *G06T 7/73* | (2017.01) |
| *G06T 3/40* | (2006.01) |
| *G06V 10/22* | (2022.01) |
| *G06V 10/40* | (2022.01) |
| *G06V 10/44* | (2022.01) |

(Continued)

(52) U.S. Cl.
CPC .......... *G01C 21/206* (2013.01); *G06T 3/4038* (2013.01); *G06T 7/73* (2017.01); *G06V 10/22* (2022.01); *G06V 10/40* (2022.01); *G06V 10/44* (2022.01); *G06V 20/10* (2022.01); *G06V 20/52* (2022.01)

(58) Field of Classification Search
CPC .... G01C 21/206; G06K 9/46; G06K 9/00664; G06T 3/4038
See application file for complete search history.

(56) References Cited

U.S. PATENT DOCUMENTS

| | | | | |
|---|---|---|---|---|
| 7,619,658 B2* | 11/2009 | Baker | ................... | G06T 3/4038 |
| | | | | 348/211.11 |
| 9,158,975 B2* | 10/2015 | Lipton | ............... | G06K 9/00771 |
| 9,380,425 B2* | 6/2016 | Meredith | ................ | H04L 67/22 |

(Continued)

FOREIGN PATENT DOCUMENTS

WO WO-2017201490 A1 * 11/2017 ........... G06K 9/2063

*Primary Examiner* — Thomas Ingram
*Assistant Examiner* — Omar K Morsy
(74) *Attorney, Agent, or Firm* — Perkins Coie LLP (57) ABSTRACT

Systems and methods for generating maps for retail environments and other indoor locations, such as via autonomous or other automatic processes, are described. In some embodiments, the systems and methods access images of a retail environment captured via multiple security cameras placed within the retail environment, and generate a two- or three-dimensional digital, virtual and/or interactive map that depicts a layout of the retail environment based on features extracted from the accessed images. For example, the systems and methods may extract and/or determine walkable paths within the images, and generate a two- or three-dimensional map that is based on placing the walkable paths within the retail environment.

20 Claims, 5 Drawing Sheets

(51) Int. Cl.
  *G06V 20/10* (2022.01)
  *G06V 20/52* (2022.01)

(56) References Cited

U.S. PATENT DOCUMENTS

| | | | |
|---|---|---|---|
| 9,390,459 B2* | 7/2016 | Tamir | G06Q 90/20 |
| 9,971,015 B2* | 5/2018 | Zeine | G01S 5/06 |
| 10,030,979 B2* | 7/2018 | Bjorke | G06T 19/003 |
| 2005/0036036 A1* | 2/2005 | Stevenson | G08B 13/19608 |
| | | | 348/211.99 |
| 2019/0164219 A1* | 5/2019 | Ward | G06Q 30/0639 |

* cited by examiner

SYSTEMS AND METHODS FOR AUTONOMOUS GENERATION OF MAPS

CROSS REFERENCE TO RELATED APPLICATIONS

This application claims priority to U.S. Provisional Patent Application No. 62/572,017, filed on Oct. 13, 2017, entitled AUTONOMOUS GENERATION OF MAPS, which is hereby incorporated by reference in its entirety.

BACKGROUND

Generating maps of continuously changing areas, such as in-store, retail, or other indoor environments or locations, can be an arduous and complex process. For example, maintaining an up-to-date map of a floor plan for an entire store, group of stores (e.g., a mall, an airport, and so on), or other configurable indoor space (e.g., a convention center) is generally performed manually by updating a previously created map when the layout of certain areas change (e.g., fixtures or departments are rearranged or otherwise modified from previous configurations). Thus, it can be a difficult and time-consuming process to accurately reflect the constantly changing environment of a store or other establishment with updated maps of the current configuration.

BRIEF DESCRIPTION OF THE DRAWINGS

Embodiments of the present technology will be described and explained through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Overview

Systems and methods for generating maps for retail environments and other indoor locations, such as via autonomous or other automatic processes, are described. In some embodiments, the systems and methods access images of a retail environment captured via multiple security cameras placed within the retail environment, and generate a two-dimensional digital, virtual and/or interactive map that depicts a layout of the retail environment based on features extracted from the accessed images. For example, the systems and methods may extract and/or determine walkable paths within the images, and generate a two-dimensional map that is based on placing the walkable paths within the retail environment. The systems and methods may also or alternatively access images of a retail environment, and create an aerial view of the retail environment by stitching together the accessed images. Using the aerial view or other combined image, the system and methods identify multiple layout features (e.g., racks, counters, or other fixed, semi-permanent, or movable physical objects) within the created aerial view of the retail environment. The system and methods generate a two-dimensional (2D) map of the retail environment using the identified multiple layout features. The 2D map may include the various extracted features, such as fixtures, racks, products, people or customers, point of sale counters, or walkable paths within the retail environment. Further, the 2D map may estimate certain features (e.g., walkable or traversable paths or free areas) based on features (e.g., fixtures such as racks or counters) within the aerial view of the environment. Thus, in some embodiments, the autonomous generation of maps, such as maps that depict layouts of retail stores and/or other indoor or frequently changing environments, enable owners or retailers of the environments to provide their customers with up-to-date, accurate information of locations (e.g., product areas) within the environments.

Further, providing updated and/or current layout information with the maps enhances wayfinder capabilities of the maps, as well as other interactive applications associated with the maps and provided to customers. Thus, the systems and methods disclosed herein enable the maps to facilitate navigation within the retail environment at different levels of granularity (e.g., from department level to product level to item level), even as the layout or locations of items within the environment changes.

Various embodiments of the systems and methods will be described herein with reference to FIGS. 1-5. Although many of the embodiments are described with respect to systems and methods for autonomous map generation in a retail environment, other applications and other embodiments in addition to those described herein are within the scope of the present technology. For example, at least some embodiments of the present technology may be useful for autonomously generating maps in other environments with frequently changing layouts or features, such convention centers, airports, markets, and amusement parks. It should be noted that other embodiments in addition to those disclosed herein are within the scope of the present technology. Further, embodiments of the present technology can have different configurations, components, and/or procedures than those shown or described herein. Moreover, a person of ordinary skill in the art will understand that embodiments of the present technology can have configurations, components, and/or procedures in addition to those shown or described herein and that these and other embodiments can be without several of the configurations, components, and/or procedures shown or described herein without deviating from the present technology.

Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of a Suitable Computing Environment

Figure 1:
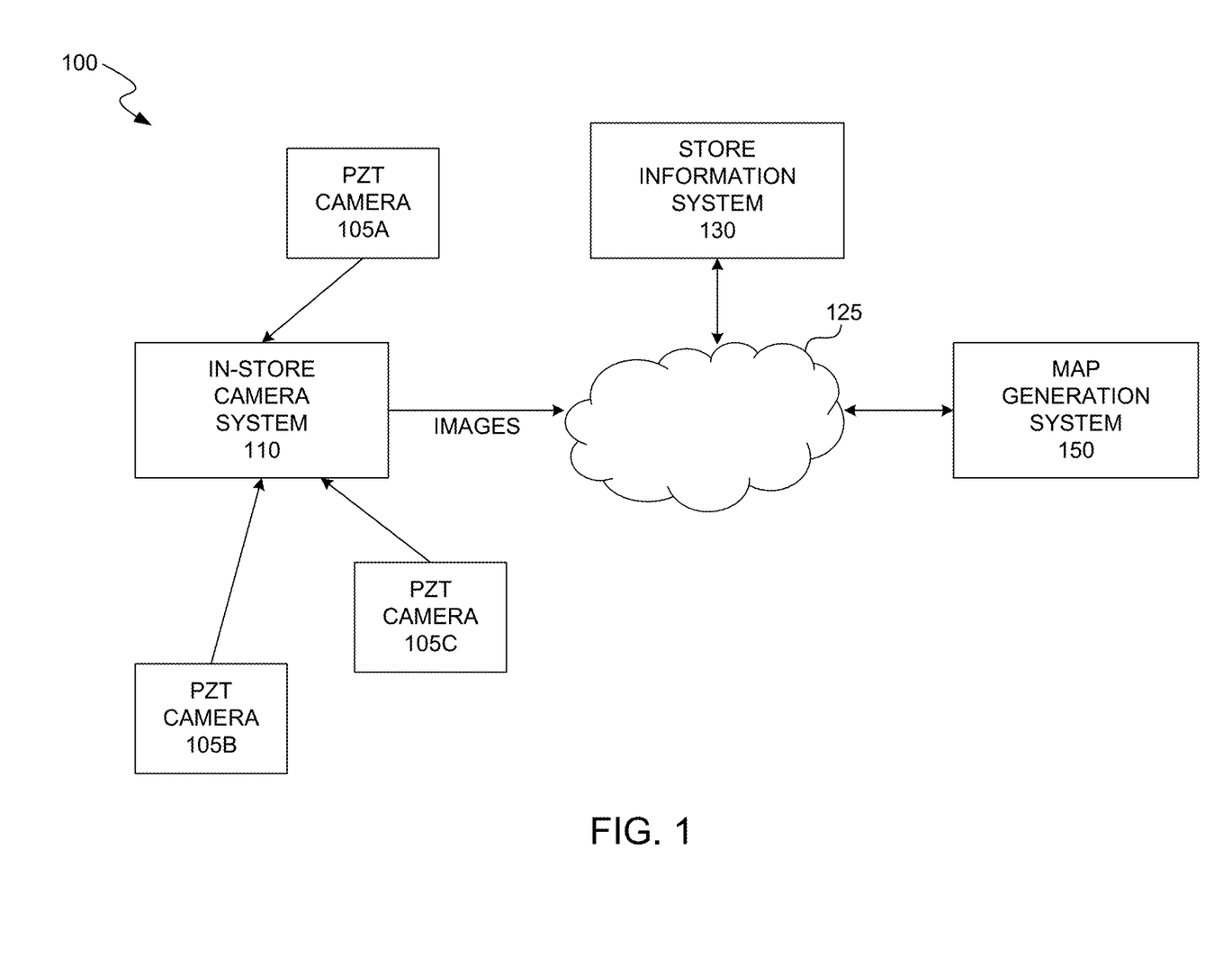
FIG. 1 is a block diagram illustrating a suitable computing environment for autonomously generating maps for indoor locations.

As Described Herein, the Systems and Methods, in Some Embodiments, generate maps autonomously from multiple images taken from a retail or other indoor environment or location, such as a retail store. FIG. 1 is a block diagram illustrating a suitable computing environment 100 for autonomously generating maps of an indoor location. The computing environment 100 includes a map generation system 150, which is configured to autonomously generate maps (e.g., two-dimensional depictions, displays, interactive presentations, and so on), of floor plans, layouts, product placements, walkable paths, or other configurations of indoor spaces or areas, such as retail store environments.

The map generation system 150 receives or accesses images from cameras positioned within a retail store, such as cameras positioned as security (e.g., anti-theft, security or surveillance) cameras within the store. For example, an in-store camera system 110 may direct, control, and/or manage one or more cameras, such as PZT (pan, zoom tilt) camera 105A-C arranged within the store and configured to capture images of the environment within the store. The cameras may be traditional security cameras, image sensors, or any imaging or capture devices configured to track and capture, at multiple different angles, images or video of a three-dimensional space, such as the inner area of a building, store, or other structure. In some embodiments, cameras are attached to structures in fixed locations, such as a wall, ceiling, shelving, door, and/or other fixed structures. In these and other embodiments, cameras are affixed to movable structures or devices, such as autonomous vehicles (e.g., drones, robots, robotic arms, etc.), a movable rail system, and/or other movable structures.

The map generation system 150, in some embodiments, accesses image feeds via a network 125, such as images taken by some or all cameras 105A-C of the in-store camera system 110. As will be described in more detail herein, the map generation system 150 combines the accessed images, via stitching algorithms, to create an aerial (or other panoramic or combined) view of an area within a store to be mapped, and generates a map based on features identified and/or extracted from the created aerial view.

Once a map is generated by the map generation system 150, the system 150 sends or otherwise transfers the generated map to various store information systems 130, which utilize the map to provide information to customers, employees, third-party contractors, and/or other individuals that would benefit from the map information. The system 150 can also provide information related to the map to various applications. In some cases, the store information systems 130 may include some or all aspects of the map generation system 150.

In some embodiments, the store information systems 130 provide interactive maps to customers and other users of a retail store or other indoor location. The interactive maps may present a two-dimensional view or layout of the retail store, based on various objects within the captured images of the retail store. The store information systems 130 may present the interactive maps to customers via physical interfaces placed within the retail store, and/or via mobile applications associated with the retail store and configured to display information associated with the retail store and perform various services or actions on behalf of the retail store. Thus, the store information systems 130 may present maps to customers via various devices, such as in-store user interfaces, or mobile devices associated with the customers. For example, the store information systems 130 may provide various applications associated with interactive maps that present updated layout information for a retail store or other indoor location, including:

Information applications, such as real-time navigation maps and/or information kiosks within the store that present updated maps of the store provided by the system 150. These kiosks, tablet computers, smart phones, or other in-store devices may present interfaces to customers that facilitate the display of information that presents locations or positions of products, departments, areas, services, and so on. In some embodiments, the system 150 transmits the information to wayfinder applications, such as applications that generate and provide walkable or traversable paths within the store from a customer's position to current positions or locations of items, products, and/or areas of interest and located within the store. In these and other embodiments, the system 150 transmits the information to item identification applications, such as applications that identify, via the interactive map, locations and/or positions of items, products, and/or fixtures within the store, as well as shopping assist applications that determine and display, based on lists of items to be purchased by a customer, preferred or optimal navigation paths within the store to guide a customer to efficiently traverse the store and obtain each of the items. In these and other embodiments, the system 150 transmits the information to advertising applications, such as applications that present advertisements, coupons, or other incentives via the interactive map to customers as they navigate the store. Thus, in some embodiments, various in-store devices or kioks, mobile applications, and/or auxiliary systems may generate or utilize updated, accurate maps of the retail store and/or various aspects thereof, in order to provide customers with layout information for a retail store, navigation assistance within the store, targeted advertisements or promotions via the map, efficient routing with the store, and other applications.

FIG. 1 and the discussion herein provide a brief, general description of the components of the network environment 100. Although not required, aspects of the network environment 100 are described in the general context of computer-executable instructions, such as routines executed by a general-purpose computer, e.g., mobile device, a server computer, or personal computer. The system can be practiced with other communications, data processing, or computer system configurations, including: Internet appliances, hand-held devices (including tablet computers and/or personal digital assistants (PDAs)), all manner of cellular or mobile phones, (e.g., smart phones), multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the environment 100 can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the environment 100 may be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative embodiment, a mobile device or portable device may represent the server portion, while the server may represent the client portion.

Examples of Autonomously Generating Maps of Retail Environments

As described herein, the map generation system 150 includes various components configured to autonomously generate maps of indoor locations or areas, such as retail stores. Such components may include functional modules or systems that are implemented with a combination of software (e.g., executable instructions, or computer code) and hardware (e.g., at least a memory and processor). Accordingly, as used herein, in some examples a module or system is a processor-implemented module, system, or set of code and represents a computing device having a processor that is at least temporarily configured and/or programmed by executable instructions stored in memory to perform one or more of the particular functions that are described herein.

In some embodiments, the systems and methods include an image module configured to access images of a desired environment or area (e.g., a retail store) captured via multiple security cameras positioned within or near the desired area, and a map generation module configured to generate a map depicting a layout of the desired area based on features extracted from the accessed images. For example, the map generation module may create an aerial view (or other wide area or panoramic view) of a retail environment by stitching together the accessed images into a combined image, identify multiple layout features within the created aerial view of the retail environment, and transform or modify the aerial view into a two-dimensional or three-dimensional map of the retail environment using the identified multiple layout features.

Figure 2:
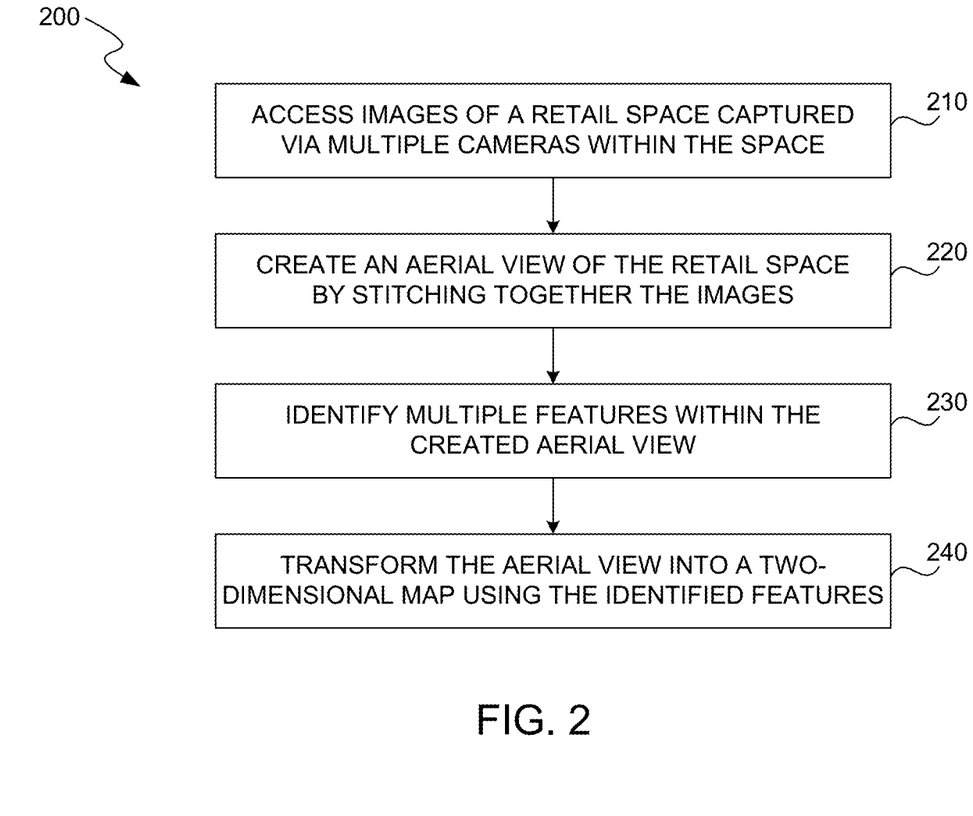
FIG. 2 is a flow diagram illustrating method for autonomously generating a map for a retail environment in accordance with embodiments of the present technology.

As described herein, the map generation system 150 may perform various processes when autonomously generating maps of retail environments. FIG. 2 is a flow diagram illustrating a method 200 for autonomously generating a map for a retail environment. The method 200 may be performed by the map generation system 150, and, accordingly, is described herein merely by way of reference thereto. It will be appreciated that the method 200 may be performed on any suitable hardware.

In operation 210, the system 150 accesses images of a retail environment captured via multiple cameras placed within the retail environment. For example, the system 150 may access images taken or captured by security cameras, such as PTZ (pan, tilt, zoom) cameras, which capture wide area images of a space during security or other tracking applications. In these and other embodiments, the cameras can be secured to fixed structures and/or movable structures.

In operation 220, the system 150 creates an aerial view of the retail environment by stitching together the accessed images. For example, the system 150 may utilize various stitching algorithms (e.g., Autopano Giga) or panorama applications that identify overlap with edges of fields of view between images, and combine the images into a single view (e.g., a segmented panorama view) of an area. The system 150, therefore, creates a combined image of the retail environment that depicts a certain view of the environment, such as an aerial view, bird's eye view, overhead view, or other elevated, top down, or angled views of the environment. Thus, in some cases, the system 150 utilizes various image processing algorithms or machine-learning processes to assist in combining PTZ images, which may not be sufficiently angled to provide an aerial view within the image, into a single, combined, aerial view of a space or environment.

In other cases, such as when the system 150 receives information identifying the positioning of the cameras within the space, the system 150 may combine the images into an aerial view without stitching the images. For example, by getting depth information from a sensor attached to one or more of the cameras 105A-C, the system 150 can build or otherwise create a three-dimensional (3D) rending of the retail store or indoor location. Thus, taking an aerial view of the 3D rendering may result in a 2D view, which the system 150 may then process and/or analyze for fixture or other object extractions.

In operation 230, the system 150 identifies multiple layout features within the created aerial view of the retail environment. For example, the system 150 identifies fixed objects (e.g., fixtures) within the aerial view, and/or dynamic movement (e.g., walking customers) within the aerial view, and determines or identifies features to be added to a generated map. In some cases, the system 150 utilizes machine learning to deduce features within the aerial view, such as fixtures, racks, products, people, point of sale counters, walkable paths, and other features, presented in the images. Thus, the system 150 may employ various processes when identifying or detecting features within the images. For example, the system may employ edge detection processes, corner detection processes, blob detection processes, ridge detection processes, and so on.

Figure 3:
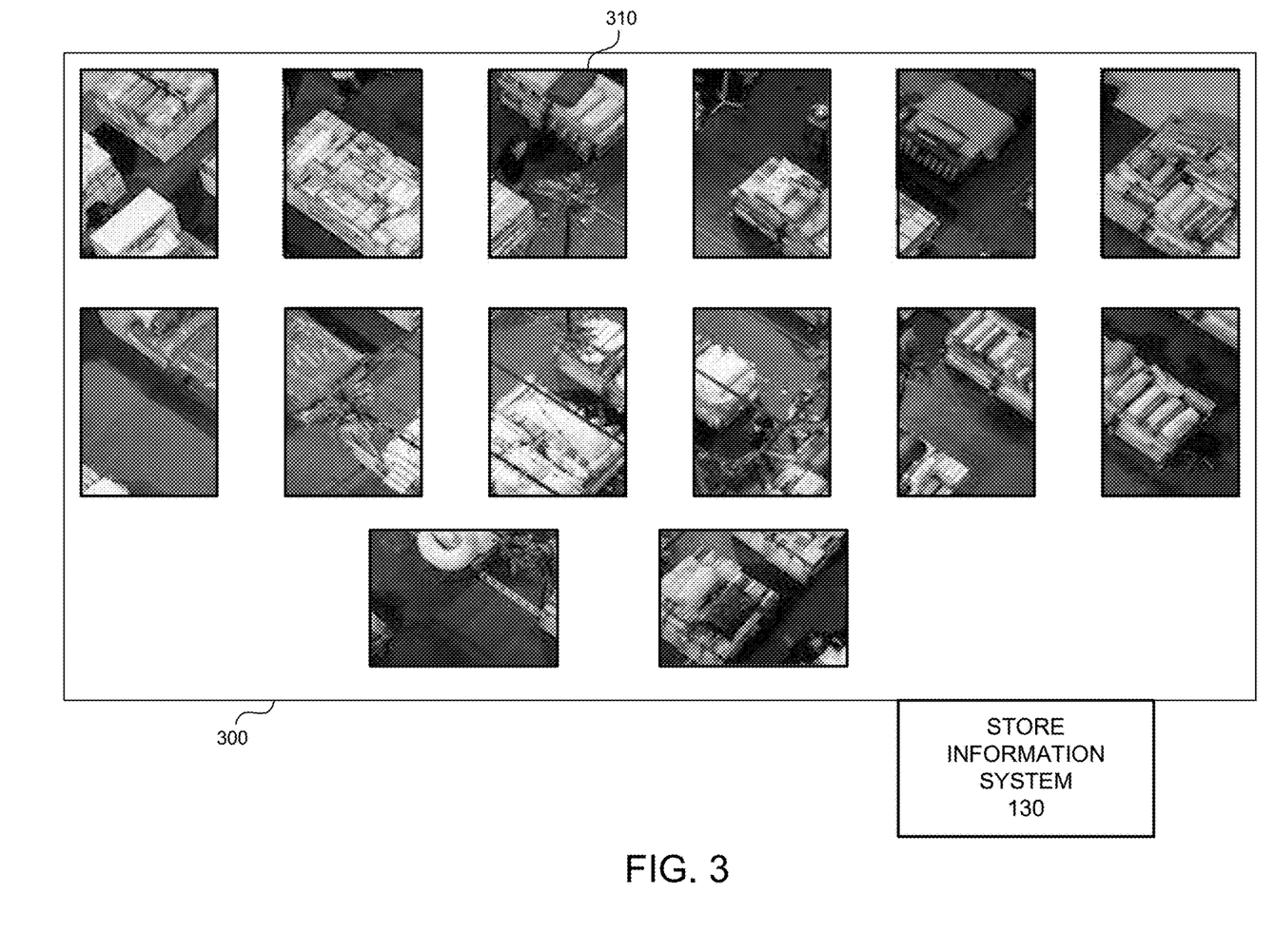
FIG. 3 depicts example images of an indoor location utilized as input for a map generating system configured in accordance with embodiments of the present technology.

FIG. 3 depicts example images utilized as input for the map generating system 150. As depicted, the in-store camera system 110 generates an image feed 300 of various images 310 taken at various angles of an area. Each image 310 may include (or, not include) certain features, such as static objects (e.g., point of sale counters, racks of products, walls), or dynamic movement (e.g., customers walking). The system 150, as described herein, may stitch together the images 300 to create a single aerial view of the area.

Returning back to FIG. 2, in operation 240, the system 150 transforms the aerial view into a two- or three-dimensional map of the retail environment using the identified multiple layout features. For example, the system 150 generates a map of various placements of fixtures and other static objects within the images, and determines or estimates walking, walkable, passable, or traversable paths (e.g., racetracks) between the fixtures (and, correspondingly), within the retail store.

Figure 4:
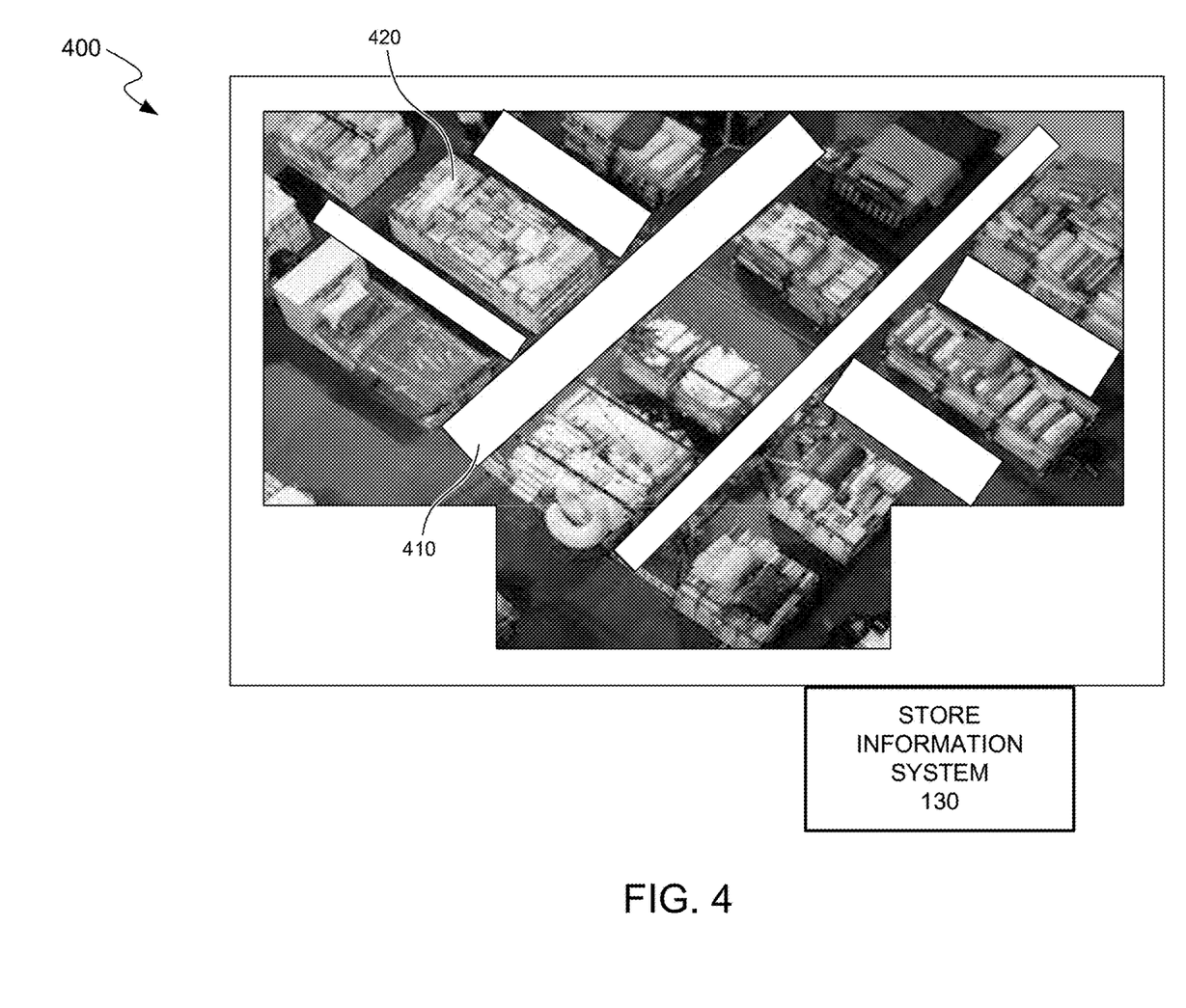
FIG. 4 is a diagram illustrating an example map autonomously generated from images captured from a retail environment.
Figure 5:
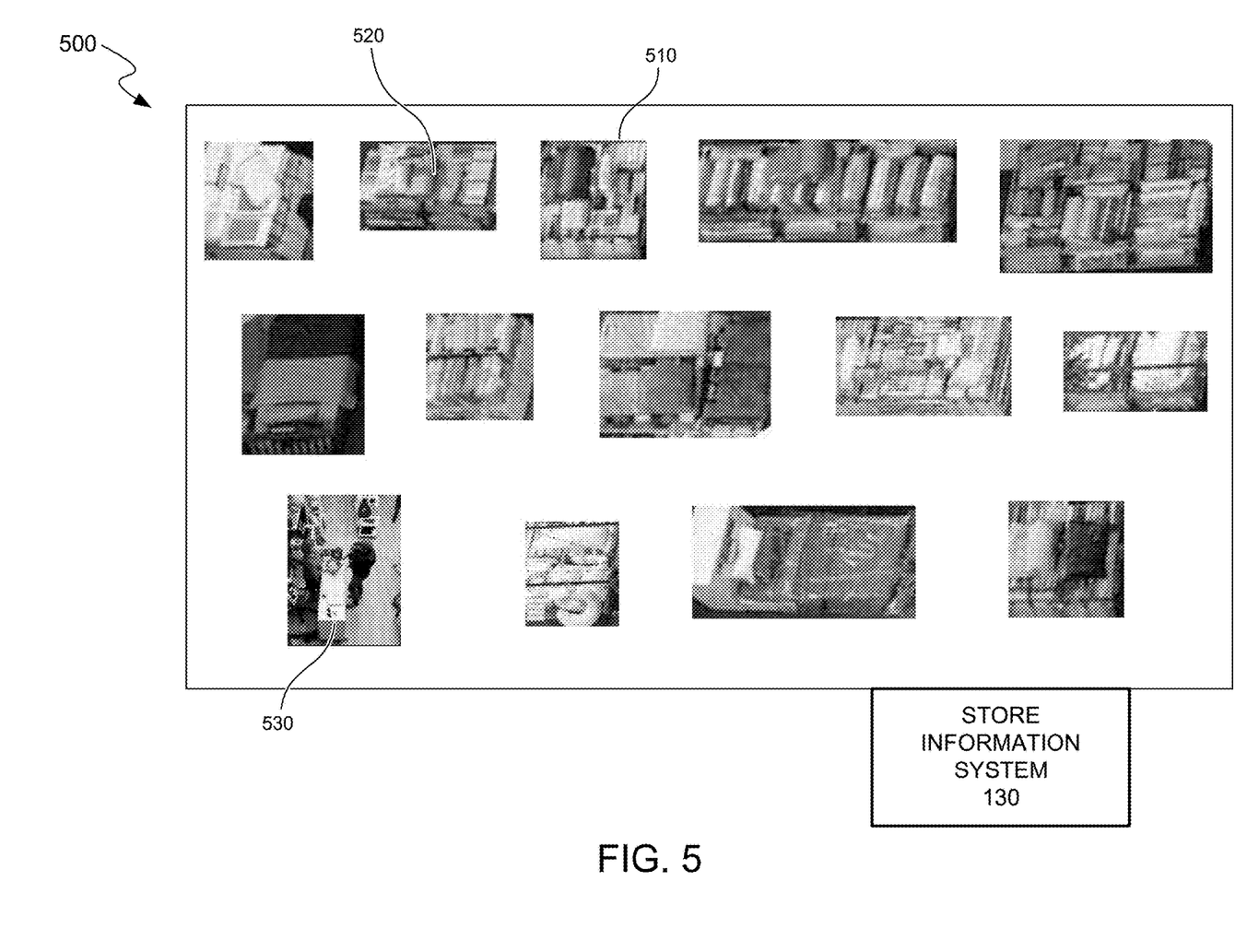
FIG. 5 depicts example images of fixtures extracted from a combined image of an indoor location.

For example, FIG. 4 is a diagram illustrating an example map 400 autonomously generated from images captured from a retail environment. The map 400 is based on the images accessed and depicted in FIG. 3, and presents estimated walking paths 410 within the area captured in the images 300. As shown, the walking paths are estimated to be positioned in areas absent any detected objects 420 within the images, such as fixtures (e.g., racks of products). Of course, the generated map may include other features, such as product placements, fixture or sale counter placements, department or section locations, paths, escalator locations, bathroom locations, cart areas, and other locations within a store or other indoor environment. For example, FIG. 5 depicts a combined image 500 of an area within a retail environment. The image includes various identified objects 510, such as fixtures 520 (e.g., racks of clothing or products) and a point of sale counter 630.

Thus, the system 150, in some cases, may generate a map (or otherwise transform images of an indoor location into a 2D map of the location by performing object recognition techniques to identify the multiple layout features within the combined image, generating an intermediate map that presents the identified multiple layout features at fixed positions within the indoor location, estimating positions of one or more layout paths based within the indoor location based on the fixed positions of the multiple layout features within the indoor location, and generating the interactive map to include the multiple layout features and the one or more layout paths within the indoor location.

As described herein, the system 150 may utilize previous maps and/or corresponding images of a retail environment when updating or otherwise generating a map of a current configuration of the retail environment. The system 150 may, therefore, access the previous maps along with current images of the environment when rendering current maps for the environment (or, portions thereof).

Further, the system 150 may automatically update or modify generated maps based on information that changes to a monitored location or environment have occurred. For example, the system 150 may receive an indication that at least a portion of the environment within the indoor location has changed, and generate an updated version of the interactive map of the environment within the indoor location that is based, at least in part, on one or more layout features within images taken by the multiple security cameras after the indication was received. The indication may be automatic (e.g. a sensor sends a message that a fixture has moved positions) or manual (e.g., a store employee may run an update to the map based on a reconfiguration of fixtures within the location).

In some cases, the system 150 identifies, within the images, specific items or other identifying fixtures, such as e-signs, SKUs, and so on, in order to associate fixtures or items to locations within the store. The system may track such information in relation to other proximate fixtures (or paths), and match the relational information when determining what images/features correspond with map layout features (e.g., racetracks, fixtures, and so on). The store information systems 130 may utilize such information when providing various applications, such as wayfinder applications, shopping assist applications, product identifications, and so on.

The system 150, therefore, generates an interactive map of an indoor location, by receiving multiple different images of an environment within the indoor location, where the images are received from multiple security cameras placed within the indoor location and configured to take the multiple different images of the environment within the indoor location, combining the multiple different images to create a combined image that presents an aerial view of the environment within the indoor location, identifying multiple layout features within the combined image of the environment within the indoor location, and generating an interactive map of the environment within the indoor location that is based on the identified multiple layout features. As described herein, the generated interactive map depicts a layout of the environment within the indoor location, and/or provides an interactive display of the environment within the indoor location.

Thus, in some embodiments, the systems and methods create two-dimensional maps of walkable paths within retail or other indoor environments using features extracted from wide area images of the environments, such as via PZT or other security-type cameras that capture images of the environments, among other benefits.

In doing so, the systems and method improve upon existing map generation systems, utilizing existing infrastructure (e.g., security cameras) and/or to monitor a space or location, determine when the space or location has changed (e.g., contents within the space have been modified), identify those changes, and update maps that present various aspects of the space or location with current information, such as current layout or item placement information.

CONCLUSION

Unless the context clearly requires otherwise, throughout the description and the claims, the words "comprise", "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein", "above", "below", and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

We claim:

1. A non-transitory computer-readable medium whose contents, when executed by a computing system, cause the computing system to perform a method of generating an interactive map of an indoor location, the method comprising:

receiving multiple different images of an environment within the indoor location,
wherein the images are received from multiple security cameras placed within the indoor location and configured to take the multiple different images of the environment within the indoor location;

combining the multiple different images to create a combined aerial image that presents an aerial view of the environment within the indoor location;

identifying multiple layout features within the combined aerial image of the environment within the indoor location;

estimating positions of one or more walkable paths within the indoor location relative to the multiple layout features identified within the combined aerial image of the environment; and generating an interactive map of the environment within the indoor location that is based on the multiple layout features identified within the combined aerial image of the environment,
wherein the generated interactive map depicts a layout of the environment within the indoor location that includes the one or more walkable paths, and
wherein the generated interactive map provides an interactive display of the environment within the indoor location.

2. The non-transitory computer-readable medium of claim 1, wherein generating an interactive map of the environment within the indoor location that is based on the identified multiple layout features includes:

performing object recognition techniques to identify the multiple layout features within the combined aerial image;

generating an intermediate map that presents the identified multiple layout features at fixed positions within the indoor location;

estimating positions of one or more of the walkable paths based within the indoor location based on the fixed positions of the multiple layout features within the indoor location.

3. The non-transitory computer-readable medium of claim 1, further comprising:

receiving an indication that at least a portion of the environment within the indoor location has changed; and generating an updated version of the interactive map of the environment within the indoor location that is based, at least in part, on one or more layout features within images taken by the multiple security cameras after the indication was received.

4. The non-transitory computer-readable medium of claim 1, wherein combining the multiple different images to create the combined aerial image includes stitching the images together to generate a combined image that depicts a segmented panorama view of the environment within the indoor location.

5. The non-transitory computer-readable medium of claim 1, wherein receiving multiple different images of an environment within the indoor location includes receiving the multiple different images from PZT (pan, zoom, tilt) cameras arranged within the indoor location.

6. The non-transitory computer-readable medium of claim 1, wherein receiving multiple different images of an environment within the indoor location includes receiving the multiple different images from PZT (pan, zoom, tilt) cameras arranged within the indoor location and configured to take images of at least a portion of the environment within the indoor location.

7. The non-transitory computer-readable medium of claim 1, wherein generating an interactive map of the environment within the indoor location that is based on the identified multiple layout features includes determining a layout that includes multiple racetracks estimated to be positioned between the multiple different features within the indoor location.

8. The non-transitory computer-readable medium of claim 1, wherein the multiple different features include static objects positioned within the indoor location.

9. The non-transitory computer-readable medium of claim 1, wherein the multiple different features include moving objects positioned within the indoor location.

10. The non-transitory computer-readable medium of claim 1, wherein the indoor location is a retail store, and wherein the generated interactive map provides an interface via which users within the indoor location may identify walking routes to products sold within the retail store and presented within the generated interactive map.

11. The non-transitory computer-readable medium of claim 1, wherein the indoor location is a retail store, and wherein the generated interactive map is part of a shopping assist application that presents navigation paths within the retail store to users such that the users may utilize the presented navigation paths to traverse the store and obtain multiple products sold by the retail store.

12. The non-transitory computer-readable medium of claim 1, wherein the indoor location is a retail store, and wherein the generated interactive map is part of a wayfinder application that presents a path to a location within the retail store that includes a certain product sold by the retail store.

13. A method of creating a digital map of a retail environment, the method comprising:
    accessing images of a retail environment captured via multiple security cameras placed within the retail environment;
    creating an aerial, wide area, view of the retail environment by stitching together the accessed images;
    identifying multiple layout features within the created aerial view of the retail environment;
    estimating positions of one or more walkable paths within the retail environment relative to the multiple layout features identified within the combined aerial view of the environment; and
    transforming the combined aerial view into a two-dimensional map of the retail environment using the multiple layout features identified within the combined aerial view of the environment, the two-dimensional map depicting a layout of the retail environment that includes the one or more walkable paths.

14. The method of claim 13, wherein the multiple layout features include point of sale counters and racks within the retail environment, and wherein transforming the aerial view into a two-dimensional map of the retail environment using the identified multiple layout features includes estimating the positions of the walkable paths within the retail environment based on positions of the point of sale counters and racks within the retail environment.

15. The method of claim 13, further comprising:
    displaying, via a wayfinding application that presents wayfinding routes to customers within the retail environment, one or more products sold within the retail environment within the two-dimensional map.

16. The method of claim 13, wherein the multiple security cameras include PZT (pan, zoom, tilt) cameras configured to capture images of the retail environment.

17. The method of claim 13, wherein the multiple layout features include static fixtures within the retail environment.

18. The method of claim 13, wherein the multiple layout features include dynamically moving objects within the retail environment.

19. A system, comprising:
    an image module configured to access images of a retail environment captured via multiple security cameras placed within the retail environment; and
    a map generation module configured to generate a map depicting a layout of the retail environment based on features extracted from the accessed images, by:
        creating an aerial view of the retail environment by stitching together the accessed images to form a combined aerial image of the retail environment;
        identifying multiple layout features within the combined aerial image of the retail environment;
        estimating positions of one or more walkable paths within the retail environment relative to the multiple layout features identified within the combined aerial image of the environment, and
        transforming the combined aerial image into a two-dimensional map of the retail environment using the multiple layout features identified within the combined image of the environment, the two-dimensional map depicting a layout of the retail environment that includes the one or more walkable paths.

20. The system of claim 19, wherein transforming the combined image into a two-dimensional map of the retail environment using the identified multiple layout features includes estimating the positions of the walkable paths within the retail environment based on positions of the multiple layout features within the combined image.

* * * * *